United States Patent Office 3,481,831
Patented Dec. 2, 1969

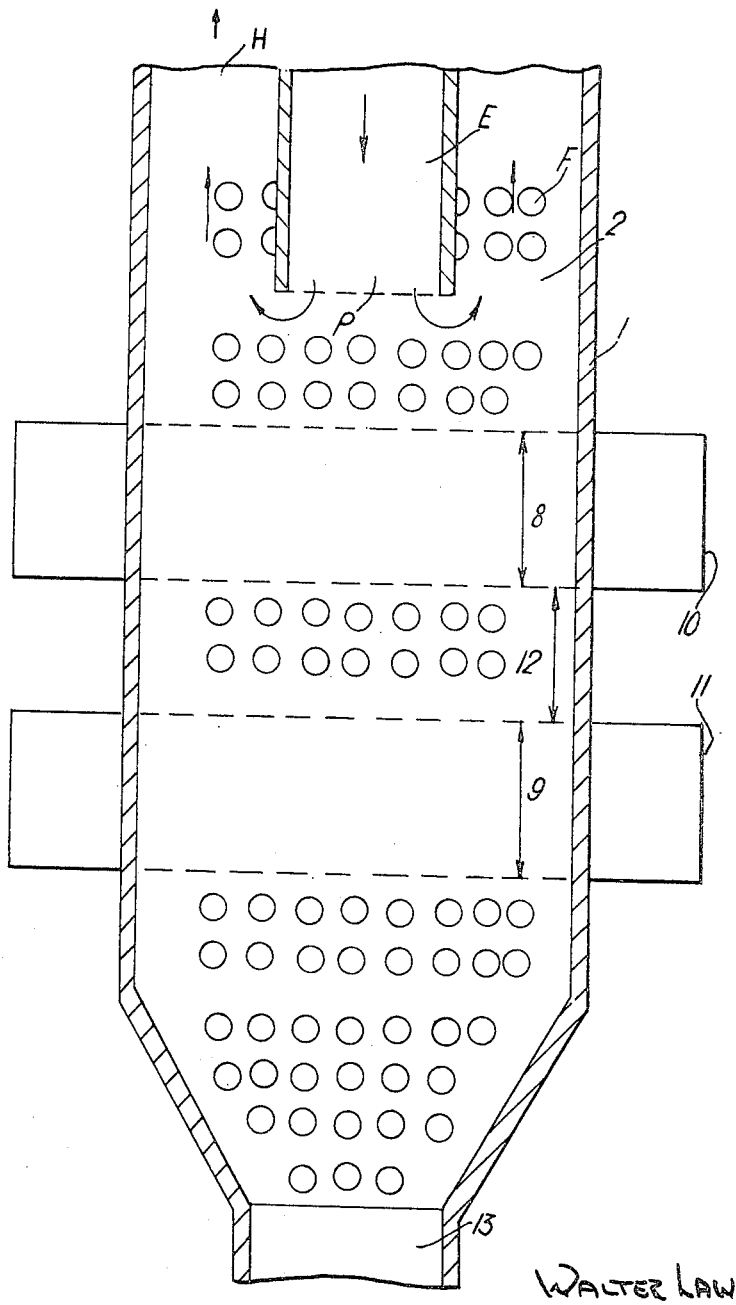

3,481,831
METHOD OF CONTAINING AND WITHDRAWING FUEL FROM THE FUEL SPACE IN A NUCLEAR REACTOR
Walter Lawrence Grant, Pretoria, Transvaal Province, Republic of South Africa, assignor to Atomic Energy Board, Pelindaba, Republic of South Africa, a body corporate of South Africa
Original application June 3, 1965, Ser. No. 461,145. Divided and this application Nov. 28, 1967, Ser. No. 686,235
Claims priority, application Republic of South Africa, June 11, 1964, 64/2,773
Int. Cl. G21c 3/16, 19/02
U.S. Cl. 176—31   3 Claims

ABSTRACT OF THE DISCLOSURE

A method of removing fuel from the fuel space of a fuel element of a nuclear reactor by melting a plug of frozen coolant supporting the fuel in the fuel space and also removing only some fuel at a time by the use of more than one frozen plug at different elevations.

---

This is a division of application Ser. No. 461,145, filed June 3, 1965.

This invention relates to a fuel element assembly for a nuclear reactor and in particular has reference to an improved method of removing fuel from the fuel space of a fuel element of a nuclear reactor.

The fuel element assembly for a nuclear reactor built in accordance with the disclosure in my co-pending application Ser. No. 461,145, filed June 3, 1965, of which this is a divison thereof, consists of a tubular fuel container with one or more coolant ducts inside the fuel container disposed parallel to and in the vicinity of the longitudinal axis of the fuel container, so as to provide a fuel space in the fuel container wherein nuclear fuel can be packed in the fuel space around the coolant duct(s) and a port or ports in the coolant duct(s) adapted to permit flow of coolant through said ports and in heat exchange relationship with the packed fuel to suitable coolant-withdrawal means and fuel supply and withdrawal means provided at opposite ends of the fuel container adapted to permit the nuclear fuel to be supplied to or withdrawn from the fuel space when desired.

The nuclear fuel may be granules which may be of any suitable size and shape so, that when they are packed together, voids will be left between the granules through which the coolant can flow. Preferably the granules are in the shape of spheres. The material of the fuel granules can be any suitable nuclear fuel such as uranium, uranium carbides, uranium alloys, e.g., with metals such as zirconium, molybdenum, niobium, etc., or uranium cermets or suitable plutonium compounds or mixed uranium-plutonium compounds. Mixtures of $U^{235}$ or $U^{233}$ with thorium giving higher conversion ratios than uranium alone, can also be used. Furthermore, the fuel granules can contain enriched nuclear fuel especially for smaller reactors. In addition, the fuel granules may be clad or unclad.

The ports in the coolant duct(s) may be provided at suitably spaced intervals along the length of the duct(s) and/or around the periphery of such duct(s). The position of such ports are governed by heat removal and flow considerations. The said ports, when communicating with the fuel space should be small enough to prevent the passage therethrough of the fuel granules in the fuel space. Where the coolant duct is the preferred circular cross-section tube disposed concentrically inside the fuel container, it is preferred to provide a port at that end of the duct which is remote from the coolant inlet end. Preferably in this case the port is covered by a perforated cover.

The coolant withdrawal means may include separate tubes disposed adjacent and parallel to the coolant ducts referred to above and made of similar material or may be constituted by certain of the longitudinal separate internal partitions in a single coolant duct. In these cases appropriate ports are provided in the coolant withdrawal means to correspond with ports in the adjacent coolant supply ducts so that the coolant can flow from the supply ducts through the ports in such ducts, through the packed granular nuclear fuel in the fuel container, through the corresponding ports in the coolant withdrawal means and thence along the coolant withdrawal means to the coolant outlet means.

Where a liquid metal coolant is used the coolant withdrawal means preferably includes the annular space in the fuel container wherein the granular fuel is packed. In this case the liquid coolant flows down the concentric central duct, through the bottom port therein and up through the packed nuclear fuel in the annular space in the fuel container to suitable coolant outlet means at the same end of the fuel container as the fuel supply means. Suitable sealing means can be supplied to seal the liquid metal coolant from any contact with other incompatible materials that may be used in conjunction with the fuel element assembly.

The fuel element assembly when operating with a liquid metal coolant is preferably also provided with a gas heat shield around the outside of the fuel container. For this purpose a tube of some suitable material with a low neutron cross-section is disposed concentrically around the outside of the fuel container and the annulus so formed is filled with some suitable gas such as nitrogen or helium.

The fuel element assembly permits the supply of fresh nuclear fuel and the withdrawal of spent nuclear fuel to be effected during the operation of the reactor at full load through the oppositely situated fuel supply and withdrawal means.

In one embodiment of the fuel element assembly, using a vertically disposed fuel container and a liquid metal coolant, the fueling of the fuel element assembly can be done at full load by feeding the fuel directly into the annular fuel space in the fuel container. For this purpose fresh fuel can be fed to the fuel bed through a fuel feed tube via an isolating fuel transfer valve. The isolating valve will prevent any fission gases escaping through the fuel feed tube. This is an extra safety measure as there will be no problem of back flow through the feed tube in view of the fact that the pressure in the fuel space is low. The whole isolating valve and associated tubes may be filled with the liquid metal coolant and heated to a suitable temperature when fresh fuel is fed, e.g., above 100° C. in the case of sodium coolant. The fuel granules can then fall by gravity into the fuel annulus and hence to the top of the fuel bed by appropriate manipulation of the isolating valve.

Spent fuel can be removed from the bottom of the fuel element assembly by a suitable extractor. Such extractor can be provided by a rod of suitable material disposed on the longitudinal axis of the fuel container and adapted to close and open the fuel discharge opening at the bottom of the fuel container by appropriate up and down movements. Alternatively, in the manner of the present invention, the bottom end of the fuel container may be provided with a zone or zones adapted to be cooled sufficiently to freeze the liquid metal coolant in the vicinity of such zone or zones so as to block off the bottom end of the fuel space by a plug of frozen coolant wherein fuel granules are embedded. When it is desired to extract spent fuel the cooling of the said zone or zones is discontinued and the said plug is melted, e.g., by heat conducted from the hot parts of the fuel space, thereby allowing spent fuel to pass out of the bottom of the fuel container. Preferably at least two vertically spaced cooling zones are provided so that by alternatively melting the plug of one zone while the other is still frozen the batchwise removal of spent fuel can be effected while continuously supporting the fuel column on a plug of solid coolant.

The bottom end of the fuel element assembly can be made to fit into a suitable discharge stand pipe which, in turn, may be connected to an inclined duct. Between the stand pipe and the fuel element assembly there may be a short length of flexible bellows to take up the differential, axial thermal expansion. The temporary sealed joint between the stand pipe and the fuel element assembly can be made of suitable material such as lead, which has a melting point above that of the coolant, e.g., sodium or lithium 7. The spent fuel coolant mixture can migrate down the heated inclined duct and discharge into a suitbale discharge machine which can be positioned and operated remotely to join up with the said duct. The contents of the duct can be emptied into special canisters in the machine and provision can also be made to withdraw this machine into a special bay for maintenance etc. Full and temporary sealed canisters can be transferred from the machine to a process plant, remotely operated, that finally seals the canisters ready for storage in a storage bay. These can be kept there long enough for an appropriate fall-off of activity to occur before being transferred for transport from the site of the nuclear reactor via some suitable remotely operated transfer bay. At the fuel discharge end the spent fuel may be held for a convenient length of time and at a sufficient temperature to allow some of the fission products to plate out, which may otherwise deposit at the position of lowest temperature in the fuel element or heat exchanger.

From the above it will be seen that the fuel throughput in the fuel element assembly can be varied at will, which also gives a means of reactivity control. In fact, the fuel discharge mechanism could be so designed that the fuel could, in an emergency, be discharged into the spent fuel storage space, hence shutting down the reactor. Fueling will normally be done at full load by feeding the fuel granules directly into the fuel container and by extracting at the same time the spent fuel at the bottom. It is considered that the relatively simple onload fueling and spent fuel extraction afforded by this invention is one of its major advantages. The fact that fresh fuel will be added on the top and spent fuel extracted at the bottom of the fuel element assembly also has major burn-up advantages.

The heat exchanger is preferably one according to our co-pending application Ser. No. 461,106 filed June 3, 1965, now abandoned (hereinafter called "the preferred heat exchanger").

Where the preferred heat exchanger is used with the preferred fuel element assemblies according to this invention, the heat exchanger is mounted on that end of the fuel element assembly at which fuel and coolant is fed into the assembly and from which the coolant is also withdrawn. In such an integral fuel element-heat exchanger assembly the preferred liquid metal coolant will flow directly from and to the heat exchanger through suitable built-in ducts.

Suitable pumps can be used whenever required to pump the liquids and gases employed in the reactor. Thus, in the preferred embodiment of this invention employing the fuel element-heat exchanger units, the liquid metal coolant is preferably pumped by an electro-magnetic induction pump of known construction built into the heat exchanger. So also, for gases or non-metal fluids, suitable centrifugal, axial, diaphragm or the like pumps may be used.

The invention will now be described in detail in connection with the accompanying drawing in which:

The figure is a diagrammatic section elevational view of the lower end of a fuel element assembly illustrating the fuel withdrawal means of the present invention.

My co-pending application Ser. No. 461,145, filed June 3, 1965, illustrates therein fuel element assemblies for a nuclear reactor consisting of two nuclear fuel containers with one or more coolant ducts inside the fuel container disposed parallel to and in the vicinity of the longitudinal axis of the fuel container, so as to provide a fuel space in the fuel container. Nuclear fuel which may be in the form of granules can be packed in the fuel space around the coolant ducts. A port or ports may be provided in the coolant ducts, adapted to permit flow of coolant through said ports and in heat exchange relationship with the packed fuel to suitable coolant withdrawal means. Fuel supply and withdrawal means provided at opposite ends of the fuel container are adapted to permit the nuclear fuel to be supplied to or withdrawn from the fuel space when desired.

The figure illustrates an embodiment using a liquid metal coolant, for example liquid sodium, which flows down through the coolant duct E out through the port P into the fuel space 2 packed with the granular nuclear fuel F and up through the voids between the fuel granules to the coolant outlet H situated at the top of the fuel element assembly. The fuel container 1 extends downward below the port P in the coolant duct E and on this downward extension there are provided two zones 8 and 9 respectively which are adapted to be cooled by suitable cooling means 10 and 11 surrounding the fuel container 1. Each of the said cooling means 10 and 11 is adapted to cool the corresponding zone 8 or 9 sufficiently to freeze the liquid metal coolant therein so as to form a plug composed of solid coolant containing spent fuel granules entrapped therein. To operate this fuel withdrawal means the cooling means 10 is actuated to form a plug of solid coolant in zone 8 which plug is designed to be of suitable dimensions so as to enable it to support the column of liquid coolant and granular fuel in the fuel space 2 above it. A similar plug also extends over zone 9 as a result of appropriate actuation of cooling means 11. By discontinuing the actuation of cooling means 10 plug 8 will be melted by heat conducted through the liquid metal coolant and granular fuel above it from the heat generated in the active granular nuclear fuel thereby permitting spent nuclear to settle down by gravity through zone 8 onto the plug in zone 9. Cooling means 10 is then again actuated so as to freeze a plug in zone 8 whereafter the actuation of cooling means 11 is discontinued permitting plug 9 to melt by heat conducted from the still hot liquid metal coolant and spent granular fuel in the space 12 between zones 8 and 9. This permits the spent nuclear fuel to pass, under the influence of gravity, through the discharge passage 13 to suitable spent fuel disposal means.

Instead of employing two cooling zones 8 and 9 and attendant cooling means 10 and 11 only one can be used. Furthermore, instead of relying on heat supplied by conduction from the active nuclear fuel in the fuel space 2 heat may be actually supplied from suitable heating means associated with the cooling means 10 and 11. Any suitable and well known cooling or heating means may be employed.

It will be obvious to those skilled in the art that various changes may be made without departing from the scope of the invention and the invention is not to be considered limited to what is shown in the drawing and described in the specification.

I claim:

1. A method of supporting nuclear fuel in a fuel element of a nuclear reactor, the fuel element having an elongated fuel space with a fuel charging opening leading into it, and a fuel discharge opening leading out of it, the fuel element being adapted to accommodate coolant flow through the fuel space, the method comprising the steps of (a) mounting the element such that its longitudinal axis is directed upwardly and such that the fuel discharge opening is at the bottom of the fuel space;
(b) admitting fluid coolant into the fuel space;
(c) freezing the coolant in the fuel space to form a plug of frozen coolant above the level of the discharge opening;
(d) admitting nuclear fuel in divided form into the coolant in the fuel space; and
(e) permitting the fuel to gravitate down onto the frozen plug.

2. A method of containing nuclear fuel in and withdrawing nuclear fuel from the fuel space of a fuel element of a nuclear reactor, which includes the steps of supporting the fuel as claimed in claim 1, and of then withdrawing fuel from the fuel space of the fuel element by melting the plug, and by permitting the fuel to gravitate out of the fuel space through the fuel discharge opening.

3. The method of claim 2, which includes the further step of providing at least one additional plug of frozen coolant in the fuel space above the level of the discharge opening, and of maintaining one plug while the other is melted, thereby permitting the batchwise removal of fuel by gravity from the fuel space.

References Cited
UNITED STATES PATENTS

| | | | |
|---|---|---|---|
| 2,894,892 | 7/1959 | Zinn | 176—31 |
| 3,034,689 | 5/1962 | Stoughton et al. | 176—31 |
| 3,039,945 | 6/1962 | Slack et al. | 176—31 |
| 3,228,852 | 1/1966 | Holmes et al. | 176—32 |

CARL D. QUARFORTH, Primary Examiner

H. E. BEHREND, Assistant Examiner